May 20, 1924.  
H. CLEMENT  
OPHTHALMOLOGICAL APPARATUS  
Filed May 11, 1922  
1,494,666  
2 Sheets-Sheet 2
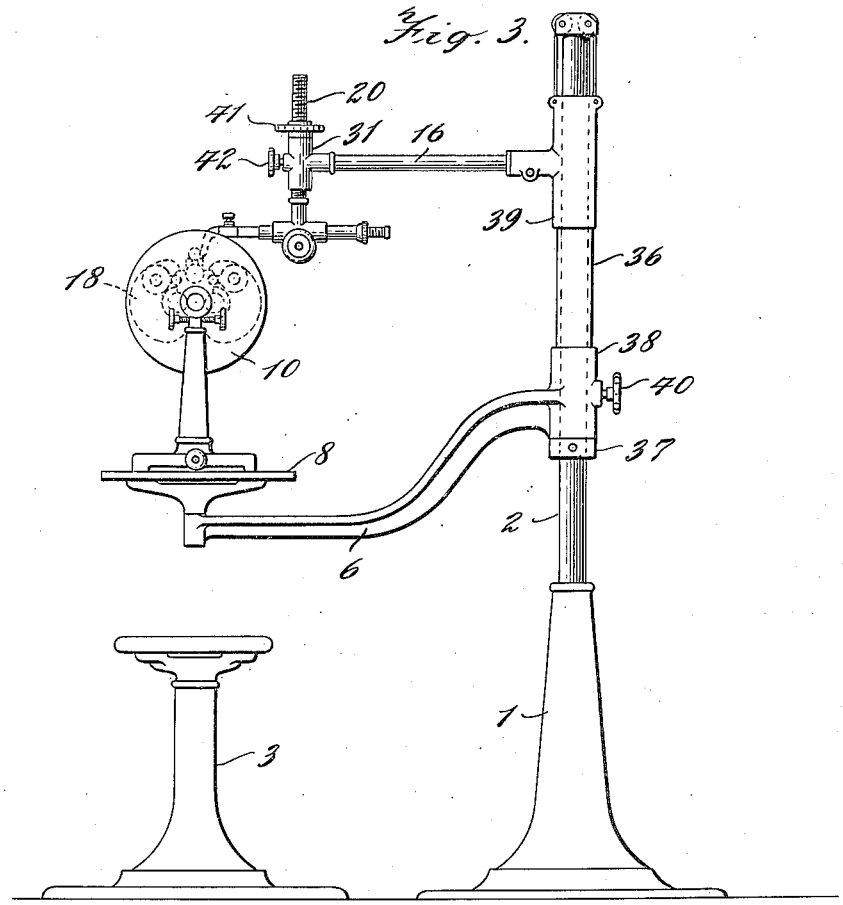
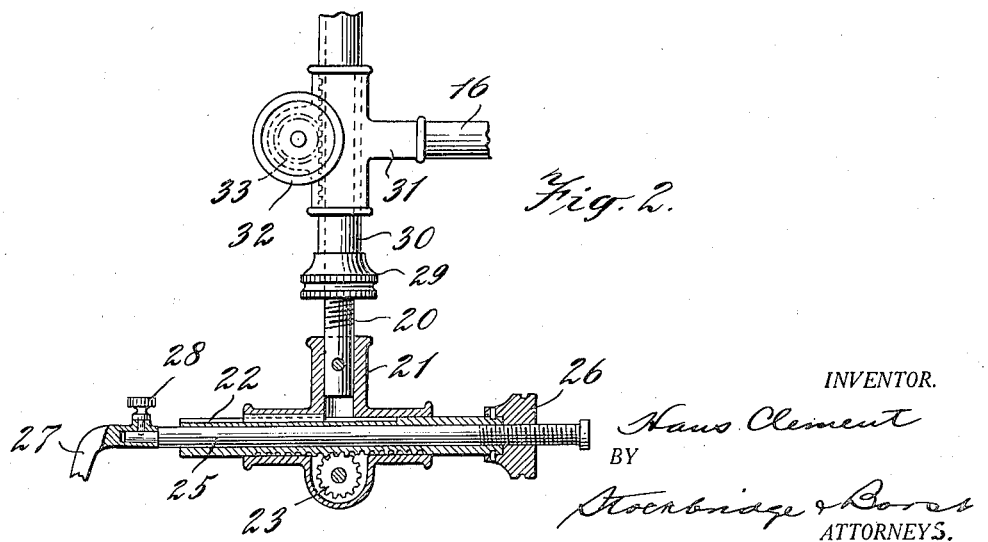

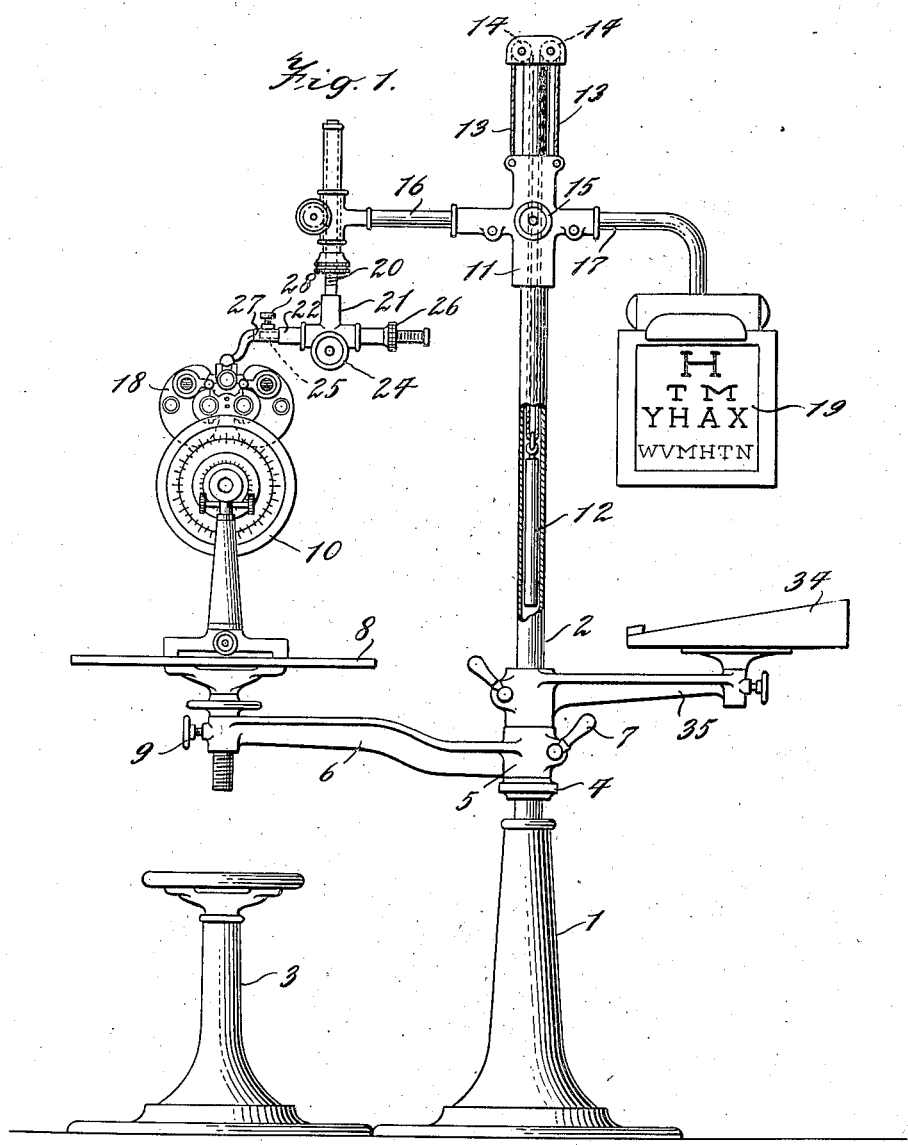

Patented May 20, 1924.

1,494,666

UNITED STATES PATENT OFFICE.

HANS CLEMENT, OF NEW YORK, N. Y., ASSIGNOR TO GENERAL OPTICAL COMPANY, INC.

OPHTHALMOLOGICAL APPARATUS.

Application filed May 11, 1922. Serial No. 559,983.

*To all whom it may concern:*

Be it known that I, HANS CLEMENT, a citizen of the United States, residing at New York city, in the county of New York and State of New York, have invented certain new and useful Improvements in Ophthalmological Apparatus, of which the following is a full, clear, and exact description.

My invention relates to optical testing devices and has for its main object to assemble into one unitary structure the usual testing instruments and their accessories in such a manner that the instruments may conveniently be brought successively into accurate location for use during the examination of a patient without the necessity of the patient changing his position.

For the purpose of explaining my invention an ophthalmometer and a suitable refractor, such as a phoro-optometer are the instruments selected as those employed for optical examination. In accordance with my invention, I support these on a single stand in such a way that either may be moved out of the way or brought into the desired position and adjusted with the utmost accuracy. Preferably the refractor is carried on a vertically adjustable arm by means of a support which has both a rough and a fine adjustment relative to the arm, while the ophthalmometer may be carried on a table or other support on an arm mounted to swing about the standard. The supports are so relatively disposed that the sight apertures of the instruments may be brought to exactly the same position.

My invention also comprehends a chart support suitably disposed with a relation to the refractor, as well as other features which will hereinafter more fully appear. I shall now describe the illustrated embodiments of my invention and shall thereafter point out my invention in claims.

Fig. 1 is an elevation party in section of a complete apparatus embodying my invention.

Fig. 2 is a detail partially in section, of the adjusting mechanism for the refractor support.

Fig. 3 is a view similar to Figure 1 of a somewhat different embodiment.

In the form shown in Figure 1, the stand consists of a base 1 and a hollow upright standard 2, on which the several arms are mounted. If desired, a stool 3 for the patient, may be included as part of the equipment and may have its position relative to the base 1 fixed or it may be an integral part of base 1.

At the proper height the standard 2 is provided with a thrust collar 4, on top of which bears a suitable split bearing 5 for an arm 6. The bearing 5 may be tightened in the usual way by a clamping lever 7 to secure the arm in any rotative adjusted position, or may be loosened by operating the lever 7 to enable the arm 6 to be swung around. In the end of the arm 6 is supported a table 8 which may be screwed up or down to various heights and may be locked in position by a set screw 9. An ophthalmometer 10 is shown as supported on this table 8 at the proper height for the examination of a patient seated on the stool 3.

Above the bearing 5 and arm 6 there is provided a sleeve 11 slidable upon the standard 2 and suitably counterweighted, as shown, the counterweights 12 being disposed within the hollow standard 2 and being connected to the sleeve 11 by cables 13 which run over proper anti-friction devices 14 at the top of the standard. A set screw 15 may be employed to lock the sleeve in any adjusted position.

This sleeve 11 has two outwardly and oppositely extending arm 16 and 17, the former for supporting a refractor 18 and the latter for supporting a suitable chart 19. The length of the arm 16 is such that the refractor 18 may be adjusted to bring it into exactly the same position in space which the ophthalmometer is shown as occupying. To effect the necessary nicety of adjustment for this apparatus, the support for the refractor is provided with both rough and fine adjustments in addition to the adjustability of the sleeve and arm by which it is supported, as a whole. The construction of this adjusting mechanism is illustrated in detail in Figure 2.

Depending from the arm 16 is a rod 20 secured to the lower end of which is a cross-shaped casting 21 which serves as the bearing for the mechanism for adjusting the refractor laterally or in a horizontal plane. Within the horizontal tubular portion of the bearing 21 is a sleeve 22 having rack teeth formed on its lower side and preferably splined to the bearing so as to permit of longitudinal movement while relative rotative movement in the bearing is avoided.

A pinion 23 which bears in the casting 21 engages with the rack teeth on the under side of the sleeve 22, and a hand wheel 24 is provided on the shaft for the pinion 23 for manual operation of the pinion to move the sleeve 22 longitudinally within its bearing.

Within the sleeve 22 is a rod 25 which is slidable longitudinally in the sleeve 22, and a micrometer adjustment is provided for this rod. As shown, the rod 25 is screw threaded for part of its length and a nut 26, which is rotatably connected on the end of the sleeve 22, engages the screw threads on the rod 25. The connection between the nut 26 and the sleeve 22 may be variously made, and, as shown, there is a circumferential groove near the end of the sleeve 22 and the nut is shaped to extend over the grooved end of the sleeve and has one or more pins which engage in the circumferential groove. In this way the nut 26 is free to turn relative to the sleeve 22, but the two are compelled to move longitudinally as a unit.

The rod 25 has one end reduced and a holder 27 for the refractor 18 is made hollow and fits over the reduced end of the rod 25. A set screw 28 secures the holder on the end of the rod, and preferably the opening in the holder for the reception of the set screw is elongated circumferentially of the holder in order to permit the refractor to be turned angularly for a few degrees on the rod 25.

The rod 20 may be connected to the arm 16 in any suitable way, and preferably so that the height of the rod 25 and hence of the refractor may be adjusted relative to the arm 16. I have shown this vertical adjusting mechanism as a duplicate of the horizontal adjusting mechanism, the rod 20 corresponding to the rod 25, the nut 29 corresponding to the nut 26, the sleeve 30 corresponding to the sleeve 22, the bearing corresponding to the bearing 21, the 31 corresponding to the bearing 21, the hand wheel 32 corresponding to the hand wheel 24 and the pinion 33 corresponding to the pinion 23. It is manifest that with this adjusting mechanism the refractor may be brought very accurately into proper position with the sight apertures directly aligned with the patient's eye.

After the examination by the optician with the ophthalmometer is completed, the lever 7 is loosened and the arm 6 is swung around out of the way. The set screw 15 is then released and the sleeve 11 brought down on the standard 2 until the refractor 18 is substantially at the right height. Further adjustment of the refractor in a vertical direction will be made by turning the hand wheel 32, while the adjustment for the last fraction of an inch may be made by turning the nut 29. At the same time the hand wheel 24 is turned until the refractor is substantially in the correct lateral position, while the last fine adjustment is made by turning the nut 26.

In using the refractor, it is desirable that the patient look at the usual testing chart. It is common practice for the patient to look at the reflection of the chart in a mirror and the chart 19 is so located that the patient, in looking through the refracting instrument, may see the reflection of the chart 19 in a mirror behind the examining optician. For this purpose the chart 19 is disposed so that its middle line is substantially in alignment with the sight apertures of the refractor in the latter's mean adjusted position.

As a matter of convenience for the examining optician a tray 34 may be supported on the end of an arm 35 rotatably mounted on the standard 2 immediately above the bearing 5.

In Figure 3 a slightly different form of construction is shown, in which the two arms 6 and 16 are not vertically adjustable relative to each other. A sleeve 36 slides upon the standard 2 and is suitably counterweighted, as in the construction previously described, and bears on top of a suitable thrust collar 37 which also serves as a thrust for the bearing bracket 38 for the arm 6 which is rotatably mounted on the lower end of the sleeve 36, while the bearing bracket 39 for the arm 16 is permanently secured upon and fixed to the sleeve 36. A set screw 40 serves to lock the arm 6 in adjusted position.

In this construction the means for vertically adjusting the refractor differs somewhat from that shown in Figure 1 in that there is not provided both the means for rough and fine adjustment. The rod 20 is screw threaded and engaged by a nut 41 which is rotatably secured on the end of the bearing 31. A set screw 42 locks the rod 20 in adjusted position.

A noteworthy merit of the construction of apparatus embodying my invention is its rigidity. It is well known that an examination with a phoro-optometer cannot be accurately and efficiently made unless the instrument is held immovable, and an inherent weakness in stands of this character heretofore used has been the lack of sufficient rigidity. This defect is eliminated with my device.

It is obvious that various modifications may be made in the constructions shown in the drawings and above particularly described within the principle and scope of my invention.

I claim:

1. An optical examination device comprising a standard, two arms mounted to swing on vertical axes on the standard, and a support on each arm for an optical testing instrument, the two supports being so disposed that the two instruments can be brought into substantially the same examination position in space by the rotation of the arms about their vertical axes.

2. An optical examination device comprising a standard, two arms mounted to swing on vertical axes on the standard, at least one of the arms being vertically adjustable on its axis, and a support on each arm for an optical testing instrument, the two supports being so disposed that the two instruments can be brought into substantially the same examination position in space by the rotation of the arms about their vertical axes and by the relative vertical adjustment of the said one arm.

3. An optical examination device comprising a standard, two arms mounted to swing on vertical axes on the standard, at least one of the arms being vertically adjustable on its axis, a support on each arm for an optical testing instrument, and means for adjusting one of the supports relative to its arm in both a horizontal and a vertical plane, the two supports being so disposed that by means of the rotation of the arms on said vertical axes and of the relative adjustment of the said one arm and support they can be brought into substantially the same examination position in space.

4. An optical examination device comprising a standard, an arm rotatively mounted on the standard, a counterweighted sleeve slidably mounted on the standard above said arm, a second arm carried by said sleeve, and a support on each arm for an optical testing instrument, the two supports being so disposed that the two instruments can be brought into the same position in space.

5. An optical examination device comprising a standard, an arm rotatively mounted on the standard, a counterweighted sleeve slidably mounted on the standard above said arm, a second arm carried by said sleeve, a support on the lower arm for an optical testing instrument, and a support on the upper arm adjustable relative to its arm in both a horizontal and vertical plane and adapted to hold an optical testing instrument in such relation to that on the first support as to be interchangeable therewith in position in space.

6. An optical examination device comprising a standard, a sleeve mounted thereon for angular and longitudinal adjustment, two oppositely extending arms carried by the sleeve, a support on the one arm for an optical testing instrument, and a test chart on the other arm horizontally aligned with the optical testing instrument.

7. An optical examination device comprising a standard, a sleeve mounted thereon for angular and longitudinal adjustment, two oppositely extending arms carried by the sleeve, a support on the one arm for an optical testing instrument, means for adjusting the support in both a vertical and horizontal plane, and a test chart on the other arm having its middle line in substantially horizontal alignment with the mean vertical position of the sight apertures of the optical testing instrument.

8. An optical examination device comprising a standard, a sleeve mounted thereon for angular and longitudinal adjustment, two oppositely extending arms carried by the sleeve, a support on the one arm for an optical testing instrument, a test chart on the other arm horizontally aligned with the optical testing instrument, and a third arm rotatively mounted on the standard and adapted to support an optical testing instrument in such position as to be interchangeable with the first mentioned instrument in position in space.

9. An optical examination device comprising a supporting bearing, a sleeve slidable in said bearing, means for adjusting said sleeve in its bearing, a rod slidable in said sleeve, means for longitudinally adjusting said rod, an optical testing instrument carried by the rod, and means for adjusting the bearing in a direction at right angles to the longitudinal axis of the rod.

10. An optical examination device comprising a vertical supporting standard, a supporting arm adjustably supported thereon, a bearing carried by the arm and vertically adjustable relative thereto, a sleeve slidable in said bearing and provided with a longitudinally extending rack, a manually rotative pinion engaging said rack, a rod slidable in the sleeve and provided with screw threads, a nut engaging the threads and rotatively secured to the sleeve, and an optical testing instrument carried by the rod.

11. An optical examination device comprising a vertical supporting standard, a supporting arm adjustably supported thereon, a bearing carried by the arm and vertically adjustable relative thereto, a sleeve slidable in said bearing and provided with a longitudinally extending rack, a manually rotative pinion engaging said rack, a rod slidable in the sleeve and provided with screw threads, a nut engaging the threads and rotatively secured to the sleeve, an optical testing instrument carried by the rod, and a second arm rotatively bearing on the standard and adapted to support an optical testing instrument in such position as to be interchangeable with the first mentioned instrument in position in space.

12. An optical testing instrument comprising a hollow vertical standard, a sleeve on the standard having an outstanding arm, a counterweight for the sleeve within the standard, a bearing on the end of the arm, a vertically adjustable rod in said bearing, a second bearing on the end of the rod, a second rod horizontally adjustable in said second bearing, a support on the second rod for an optical testing instrument, and an arm rotatively mounted on the standard below the first mentioned arm and having a support for an optical testing instrument so disposed that the two instruments will be interchangeable in position in space.

In witness whereof, I hereunto subscribe my signature.

HANS CLEMENT.